Feb. 22, 1966  S. P. MITCHELL  3,237,044
PICK-UP TUBE TARGET ELECTRODE ASSEMBLY
Filed June 4, 1962

Inventor
S.P. Mitchell
By
Attorneys

United States Patent Office 3,237,044
Patented Feb. 22, 1966

3,237,044
PICK-UP TUBE TARGET ELECTRODE ASSEMBLY
Stanley Percy Mitchell, Cambridge, England, assignor to Pye Limited, Cambridge, England, a British company
Filed June 4, 1962, Ser. No. 199,678
Claims priority, application Great Britain, June 9, 1961, 20,920/61
7 Claims. (Cl. 313—269)

The present invention relates to pick-up tubes and more particularly to an arrangement for reducing the vibration of electrodes within such tubes.

Certain types of pick-up tube device, notably image orthicon type tubes, include one or more electrodes which forms a large area taut, low mass surface which is liable to vibrate when subject to external shock. Such vibration can cause a change in the capacitance between this electrode and another electrode of the tube and thereby produce undesirable modulation of the output signal from the tube.

For example in an image orthicon type tube as used in the production of television signals, the charge storage target consists of a thin storage surface of glass or semiconductor material mounted parallel and close to an electron permeable membrane. This membrane is usually a fine metallic mesh which may be spaced from the storage surface by a very small distance of between 0.0005 inch and 0.004 inch. The charge storage surface and the membrane form a capacitance which is charged by the electrons produced from the photo-cathode of the tube by the primary light image. It will thus be apparent that the vibration of either or both of these electrodes would cause a change in the capacitance between the charge storage surface and the membrane which in turn produces undesirable modulation of the output signal from the tube. Moreover, such vibration may be sustained for long periods.

According to the present invention one or more damping members are attached to an electrode so as to increase its mass and thereby reduce vibration.

According to a feature of the invention, one or more damping members are positioned between adjacent surfaces of two electrodes, so as to reduce or eliminate vibration of either of these electrodes.

According to a further feature of the invention a plurality of damping members are attached to one electrode, i.e. to the membrane surrounding the target area. Advantageously, these damping members may comprise metal strips arranged on either side of the electrode. In the case of a metal mesh forming the membrane, the metal strips may be joined together through the mesh either by welding or rivetting. The assembly is then treated in a suitable atmosphere to cause the metal strips to sinter to the mesh surfaces.

In order that the invention may be more fully understood, an embodiment thereof as applied to a pick-up tube of the image orthicon type will now be described with reference to the accompanying drawings, in which.

Figure 1:
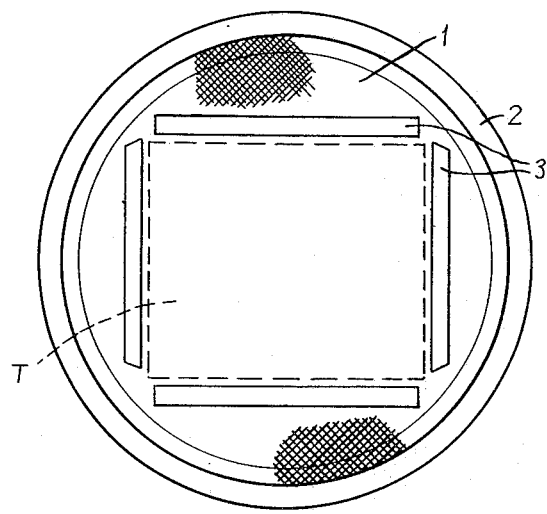
FIGURE 1 is a plan view of a mesh electrode assembly including damping members.
Figure 2:
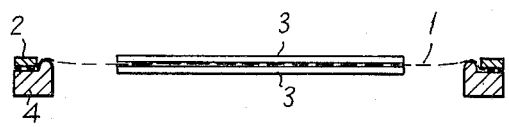
FIGURE 2 is a diametric cross-section of the assembly in FIGURE 1.

Referring to FIGURES 1 and 2, the assembly shown comprises a circular structure consisting of an electron permeable membrane 1 made from the metallic mesh surrounded by a retaining ring 2. The mesh has an area larger than the desired target area of the pick-up tube indicated by the broken line rectangle T. A plurality of damping members 3, each in the form of metal strips, are mounted on both sides of the mesh outside the target area, these strips being made of a metal which will sinter to the mesh surface when heat treated. The strips are joined together by welding through the mesh or by rivetting by means of extruded holes in the metal strips. The assembly is then heat treated in a suitable atmosphere to cause the metal strips to sinter to the mesh surface. FIGURE 2 shows a cross-section through the assembly after heat treatment and shows how the mesh is clamped to a supporting ring 4 by means of the retaining ring 2.

Figure 3:
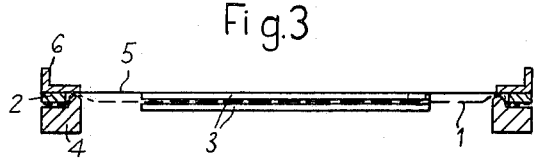
FIGURE 3 is a similar cross-section of an electrode assembly comprising a charge storage surface and electron permeable membrane.

FIGURE 3 shows the assembly including the damping members arranged in position relative to the charge storage electrode 5 which comprises a membrane of glass or semiconductor material mounted on a supporting ring 6. It will be seen that when the mesh and membrane are clamped close together, the adjacent damping members 3 contact the surface of the membrane and so serve to damp out vibration of either of the mesh or membrane.

Figure 4:
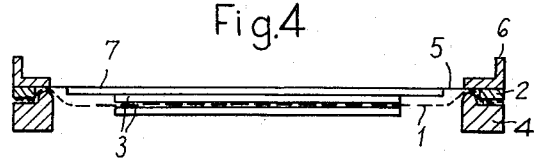
FIGURE 4 is a similar cross-sectional view of a further embodiment.

FIGURE 4 shows a modification of the embodiment of FIGURE 3 wherein an extra spacing member 7 is provided between the glass membrane 5 and the metal strips 3. This extra spacing member allows for the assembly of the membrane and damping strips to be used in tubes having different spacing of the mesh 1 from the membrane 5. The spacing chosen depends on the application for which the tube is to be used. The additional spacing member 7 may consist of strips or a frame or apertured disc, and may be made of aluminium, or of any other suitable metallic or non-metallic material. The spacing member 7 is held clamped between the mesh 1 and the electrode 5.

Whilst particular embodiments have been described, it will be understood that various modifications may be made without departing from the scope of this invention. Thus the invention may be applied to electrode assemblies in other pick-up tubes, besides image orthicon type tubes. Furthermore the damping members 3 on at least one side of the mesh could comprise the sides of a single apertured frame instead of being a plurality of separate strips. Moreover other arrangements and shapes of vibration damping members may be provided.

I claim:

1. A pick-up tube target electrode assembly including an electrode in the form of a metal mesh wherein at least one vibration damping member is solely supported by and secured to at least one surface of said mesh electrode outside the target area so as to increase the mass of said mesh electrode and thereby reduce vibration of the electrode.

2. An assembly as claimed in claim 1, in which at least one vibration damping member is arranged on both sides of the metal mesh.

3. An assembly as claimed in claim 2, in which the vibration damping members on both sides of the metal mesh are joined together through the mesh.

4. An assembly as claimed in claim 1, in which the vibration damping members comprise plural metal strips.

5. An assembly as claimed in claim 4, in which the metal strips surround the target area.

6. A pick-up tube target electrode assembly comprising an electrode in the form of a metal mesh arranged in parallel and closely spaced relationship to a charge storage electrode and supporting means for said electrodes, wherein at least one vibration damping member is disposed between the mesh and the charge storage electrode outside the target area, said at least one member being solely supported by and secured to said mesh and spaced inwardly from said electrode supporting means, so as to increase the mass of said mesh electrode.

7. An assembly as claimed in claim 6, inclding one or more spacing members provided between the charge storage electrode and the adjacent at least one vibration damping member.

References Cited by the Examiner

UNITED STATES PATENTS

| | | | |
|---|---|---|---|
| 2,909,687 | 10/1959 | Turk et al. | 313—269 X |
| 3,035,197 | 5/1962 | Turk | 313—269 |
| 3,202,857 | 8/1965 | Antoniades | 313—89 |

JOHN W. HUCKERT, *Primary Examiner.*

GEORGE WESTBY, *Examiner.*

L. ZALMAN, *Assistant Examiner.*